US010990732B1

(12) United States Patent
Raja et al.

(10) Patent No.: US 10,990,732 B1
(45) Date of Patent: Apr. 27, 2021

(54) SYSTEM FREQUENCY MARGIN RECOVERY VIA DISTRIBUTED CRITICAL PATH MONITORS (CPM)

(71) Applicant: Nvidia Corporation, Santa Clara, CA (US)

(72) Inventors: Tezaswi Raja, Santa Clara, CA (US); Siddharth Saxena, Santa Clara, CA (US); Ben Faulkner, Santa Clara, CA (US); Sachin Idgunji, Santa Clara, CA (US); Vinayak Bhargav Srinath, Santa Clara, CA (US); Wen Yueh, Santa Clara, CA (US); Chad Plummer, Santa Clara, CA (US); Kartik Joshi, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/777,443

(22) Filed: Jan. 30, 2020

(51) Int. Cl.
*G06F 30/3312* (2020.01)
*G06F 30/337* (2020.01)
*G06F 119/12* (2020.01)
*G06F 119/10* (2020.01)
*G06F 119/08* (2020.01)

(52) U.S. Cl.
CPC ........ *G06F 30/3312* (2020.01); *G06F 30/337* (2020.01); *G06F 2119/08* (2020.01); *G06F 2119/10* (2020.01); *G06F 2119/12* (2020.01)

(58) Field of Classification Search
USPC ........................................................ 716/113
See application file for complete search history.

(56) References Cited

U.S. PATENT DOCUMENTS

| | | | |
|---|---|---|---|
| 9,912,322 B2 | 3/2018 | Bollapalli et al. | |
| 2017/0337319 A1* | 11/2017 | Camus | G06F 30/3312 |
| 2018/0123604 A1 | 5/2018 | Raja et al. | |
| 2018/0367128 A1* | 12/2018 | Vezyrtzis | H03K 5/19 |

OTHER PUBLICATIONS

Wilcox, K., et al., "A 28nm x86 APU Optimized for Power and Area Efficiency," 2015 IEEE International Solid-State Circuits Conference, Session 4, Processors, Section 4.8, 3 pages.

Grenat, A., et al. "Increasing the Performance of a 28nm x86-64 Microprocessor Through System Power Management," 2016 IEEE International Solid-State Circuits Conference, Session 4, Digital Processors, Section 4.2, 2 pages.

* cited by examiner

*Primary Examiner* — Mohammed Alam (57) ABSTRACT

Introduced herein is an improved technique of recovering system frequency margin via distributed CPMs. The introduced technique creates and distributes multiple sets of always sensitized critical path replicas across a chip and monitors them for timing failure. The introduced technique takes feedback from these critical path replicas and dynamically boosts the clock frequency of the chip to remove the margin. The introduced technique provides more accurate and more comprehensive coverage of a chip performance.

25 Claims, 7 Drawing Sheets

SYSTEM FREQUENCY MARGIN RECOVERY VIA DISTRIBUTED CRITICAL PATH MONITORS (CPM)

TECHNICAL FIELD

This application is directed, in general, to integrated circuits (ICs) and, more specifically, to a method and system for determining a maximum operating frequency (FMAX) of a chip.

BACKGROUND

FMAX at which a chip can run is often much higher (can be 5%-10%) than what it is when shipped to the customers. FMAX is a dynamic phenomenon that depends on parameters such as: instantaneous noisy supply voltage (V); temperature (T); process corner (P); kind of workload being run on the chip; and aging of the chip over time. Process corner (P) is the impact of manufacturing process variations on the critical path delays, e.g., threshold voltage variations in standard threshold voltage (SVT)/high threshold voltage (HVT) transistors, and resistance/capacitance variations in the metal interconnects Characterizing FMAX for each chip being marketed exhaustively across all these parameters can lead to prohibitively long test times, and frequency prediction accuracy is generally traded-off for a much smaller test time. As such, instead of shipping chips at FMAX, the shipped chips are often margined for the worst-case frequency variation.

SUMMARY

One aspect provides a method for determining an actual FMAX of a chip. The method includes: obtaining a FMAX data of critical paths in a chip design; obtaining a FMAX data of potential critical path monitor (CPM) paths, which include replica paths of the critical paths; and selecting a minimum number of the potential CPM paths as selected CPM paths based on a root mean square error (RMSE) between the FMAX data of the critical paths and the FMAX data of the potential CPM paths.

Another aspect provides system for determining an actual maximum FMAX of a chip. The system includes: a processor configured to: obtain a FMAX data of critical paths in a chip design; obtain a FMAX data of potential critical path monitor (CPM) paths, which include replica paths of the critical paths; and select a minimum number of the potential CPM paths as selected CPM paths based on a root mean square error (RMSE) between the FMAX data of the critical paths and the CPM FMAX data of the potential CPM paths.

BRIEF DESCRIPTION

Reference is now made to the following descriptions taken in conjunction with the accompanying drawings, in which.

DETAILED DESCRIPTION

One of the current solutions to determine FMAX of a chip is to measure true FMAX for a low number, e.g., approximately 25, chips (uniformly picked across Process sigma space (P)) exhaustively across different workloads at a bunch of different voltages (V), and temperatures (T). Average Voltage (V) can be sensed through an analog-digital converter (ADC), Process corner (P) is sensed through a fused ring oscillator frequency, and a thermal sensor is used to measure the average temperature (T) on die. Then a 2nd order polynomial function of P, V, T is fitted to the measured FMAX, i.e. FMAX_model=g (P, V, T). For every subsequent chip, this curve fit FMAX model is used by DVFSa dynamic voltage frequency scaling system on the chip to set the frequency of each by sensing P, V, and T as mentioned before.

However, an equation-based FMAX model suffers from following limitations. First, effects of Dynamic Supply noise on instantaneous frequency cannot be captured by the FMAX model since average voltage measurements have been relied on. Second, a temperature of the die changes during the execution of the workload, while the FMAX model relies on average temperature measurements. Third, due to noise aware clock generation on chip, the instantaneous frequency of the chip is highly dynamic in nature, whereas when FMAX is referred during curve fit, it is the average frequency during the execution of a workload.

Fourth, manufacturing process variations manifest in more than one way. The ring oscillator (a.k.a. SPEEDO) used to sense Process corner is made out of a particular transistor type, e.g., a SVT transistor. However, FMAX-limiting critical path composition changes across P, V, and T. HVT transistor dominated paths get critical and limit FMAX at low voltage, low temperatures, whereas metal interconnect-based paths limit FMAX at high voltage, high temperatures. Hence a single ring-oscillator cannot be used to accurately track impact of process variation on FMAX. Also, in that sense 'P' is not really a single variable, but rather should be thought of as a collection of manufacturing process parameters i.e. P={P1, P2, . . . Pn}, where the ring oscillator just measures one of these collection of process parameters.

Fifth, aging of the chip and workload based FMAX variation are not accounted for and requires worst-case margins to be added. Lastly, a 2nd order polynomial equation will not model any higher order dependencies.

As a result, FMAX_margined=FMAX_model+margins, and FMAX_margined can end up being 5-10% slower than the true FMAX. FMAX_margined is what the chip runs at eventually. These margins are referred to as Part-to-Part variation because for the same measured P, V, T parameters, 2 chips can still have a different true FMAX.

To reduce these margins, an application that overclocks the GPU and checks when the system crashes can be invoked by the user (this is true for some product SKUs). But this is not a very end-consumer friendly approach of overclocking the GPU as the system has to often crash and restart itself.

What is really needed is an on-chip monitor which can track the various PVT effects in real time during the chip's operation. Monitoring in-situ critical paths for timing failure (RAZOR approach) is one such solution and gets rid of a lot of these margining issues, but the problem gets intractable as a large number of critical paths need to be monitored to ensure that some of those paths are sensitized every clock cycle (e.g., not get logically masked out). Also, this approach can be disruptive to the standard Partition Place and Route (PnR) flow because very close to tape-out, the critical paths, which can affect their loading, needs to be probed, and it can alter their timing slack (which would already be close to 0).

Hence, Critical path monitor (CPM) has been proposed as an alternative where multiple sets of always sensitized critical path replicas are created and monitored for timing failure. The DVFS system takes feedback from these critical path replicas to dynamically boost the clock frequency until these replicas start failing and remove margins.

Conventional work on CPM has divided critical path replicas into 3 broad categories—logic gate dominated paths, wire delay dominated paths, and paths having RAM in the data paths. A few hundreds of these replicas are spread across the die. These replica paths have tunable delay knobs that are tested during the operation to collect information on when the various categories of paths start to fail. This information is relayed to the DVFS system to infer the timing slack available. The DVFS system increases/decreases the voltage of the chip based on the timing slack available, keeping the operating frequency fixed. However, this scheme has the following issues:

Critique 1: Discretizing critical paths into just three categories and monitoring them separately to infer timing slack is suboptimal. Following are potential issues:

First, critical paths tend to be a mixture of various logic gate types (SVT, HVT, long channel length devices) and wire delays instead of solely being of a single type. The proportion of delay contributed by logic versus wire versus RAM will vary across different PVT conditions, but monitoring just the three broad categories will only result in pockets of good coverage and will still force us to margin for error in predicting the correct timing slack at all the remaining PVT conditions.

With the scheme suggested in the conventional work, the timing slack estimation would only have good accuracy at low and high voltages where the paths are fully logic or wire delay dominated. Intermediate voltages will end up having higher margins. So, monitoring just the extremes will result in inaccurate FMAX tracking at the intermediate voltages.

Second, similarly, a path made from SVT logic gates can have a similar V-F slope as a path made out of HVT logic gates+some wire delay. This would mean both paths will have similar delay at some temperatures, and depending on delay push out due to process variation, either of them could get critical.

For example, while Path A and Path B both happen to be critical at same voltage and temperature, they may have a very different datapath composition. Path A's delay may come from a mix of HVT transistor type logic gates and long wire delays, while Path B may be mostly composed of SVT transistor type logic gates, and very little wire delay. Since the compositions of the two paths are so different, they are susceptible to mutually independent process variations. Monte Carlo simulation can reveal the mismatch between the two paths. Hence, it is important to monitor both paths at the same time as either of them could limit FMAX depending on what process parameter varies.

Third, even for low voltages where logic delay dominated paths without wire delay limit the FMAX, it has been observed that different types of logic gates themselves exhibit significant mis-correlation. For example: SVT vs HVT logic gates have significant mis-correlation between them; and similarly, long channel length devices exhibit miscorrelation with respect to the nominal channel length devices. This is because these different devices need additional manufacturing steps, which lead to added variation that is independent of other device types.

Also, different threshold voltage types have different temperature sensitivity. Paths made from HVT logic gates tend to be critical at low voltage, low temperatures (e.g., 0.5 v, less than 0 C), while paths made from SVT logic gates tend to be critical at low voltage, higher temperatures (e.g., 0.5 v, greater than 100 C). And in between, the paths can be a mix of HVT and SVT logic gate delays in various proportions.

So, while it can be important to monitor the right composition of critical paths depending on PVT, it may not be valuable to monitor HVT logic paths at {low voltage, high temperatures} if they do not limit FMAX at high temperatures. For example, one of the approaches in the conventional work tracks the entire collection of logic delay paths together (it does not distinguish between HVT, SVT, Long channel length devices), and hence is prone to higher margining because at least a subset of paths it is trying to monitor are not really critical at any given PVT and so the variation being tracked is not providing useful information and needs to be margined for.

So, to summarize for Critique 1, categorizing critical paths into a few discrete groups and monitoring those groups of paths will always result in some added margins, because the composition of the paths is really a continuous spectrum of various proportion of delays contributed by different kinds of logic gate and wire types across PVT.

Critique 2: Critical paths are extracted from the timing sessions present during timing closure of the chip. However, timing sessions cover a very limited set of PVT conditions, whereas in real silicon it is desirable to monitor critical paths across the entire PVT space. Hence, just replicating critical paths from the timing sessions will not be enough. For example, if timing is closed at slow and hot timing corner (SSG), and paths are replicated from that session, then that does not give any information about what the critical paths would look like at fast and hot timing corner (FFG) This can again lead to lost PVT coverage and result in added margins.

Critique 3: The conventional work on CPM suggests that the DVFS system, which calibrates the replica paths and collects statistics on their failures, is not active all the time but is either invoked during boot or is triggered by a microcode during normal operation. This means potentially missing out on capturing worst case noise events if the DVFS system was not active during that interval, which again results in added margins to account for worst case.

Boot time calibration also happens at fixed voltage, whereas for tuning CPMs across voltages, the voltage needs to be swept. Hence this strategy is not suitable for chips which are expected to operate over a wide range of voltages.

Additionally, the conventional work's way of inferring timing slack involves testing the tunable delay knobs for various replica paths. If this test happens while some workload is running on the chip, then due to supply noise, the voltage profile will vary temporally and hence the timing slack inference will have an error associated with it and needs to be margined because different delay knobs are activated at different points of time during a workload.

Critique 4: Workload based FMAX variability is not discussed in conventional work.

Introduced herein is an improved technique of recovering system frequency margin via distributed CPM. The disclosed technique provides many advantages compared to the conventional work on CPM. Examples of those advantages are provided below.

First, critical path selection to track chip design FMAX is based on a pre-Silicon FMAX model developed based on SPICE simulations across the entire possible operating range. In the introduced technique, a pre-Silicon SPICE based chip design FMAX model is developed across a wide range of PVT conditions. Process variation is modelled by running Monte Carlo simulations. Voltage and temperature are explicitly varied in the simulations. This captures the critical path composition at various PVTs which can be a mix of SVT, HVT, Long channel devices, different amounts of wire delays etc.

As a result, the introduced technique can model how chip design FMAX will vary across the entire operating space and not just the PVT conditions where the timing sessions are available. Also, the critical paths which go into CPM are selected from a large pool of possible paths in order to minimize Root Mean Square Error (RMSE) tracking error between CPM FMAX and chip design FMAX. Unlike prior approaches that have targeted replicating paths only from the timing sessions available, the introduced technique presents a wholistic critical path monitor design for all operating conditions.

Second, local variation in critical path replicas is minimized. Critical paths replicas designed for CPM are not true replicas of the real paths, but they are tweaked to minimize their sensitivity to local variations on chip, while still capturing all the global PVT trends. Also, care is taken to align the mean frequency of CPM paths with the chip's three-sigma local variation FMAX point.

Third, a methodology to synthesize critical paths is introduced. A bottom-up approach of synthesizing critical paths from standard cells is presented, where the standard cells are clustered into mutually least correlated sets. This allows for synthesizing various flavors of critical paths that can be designed to be critical at different PVT conditions.

Fourth, critical paths in CPM are always sensitized. This is opposite of RAZOR approach where it is not always necessary that the path being monitored will get exercised, which increases the risk of functional failure in case some non-monitored path ends up failing timing.

Fifth, a simple hardware controller is provided. A simple hardware controller to boost the clock frequency is presented. DVFS logic simply has to monitor CPM failures until they reach a certain threshold and make a decision to boost the clock frequency based on that. This is unlike prior approaches where DVFS hardware has to analyze the failing statistics of logic, wire and RAM paths separately and make an inference on how much timing slack is available.

Sixth, failure count based timing slack inference is introduced. To be insensitive to local mismatches between various CPM instances, the DVFS controller looks at a certain failure rate of CPM (for example: median failure i.e. half the CPM instances on chip).

Eighth, workload based calibration is provided. Workload based FMAX variation can be tracked by retuning CPMs to a different delay.

Ninth, location of workload is considered. An activity monitor monitors which workload(s) exercises which unit(s) of the chip and allows that information to be used in weighing failures of critical paths.

Figure 1:
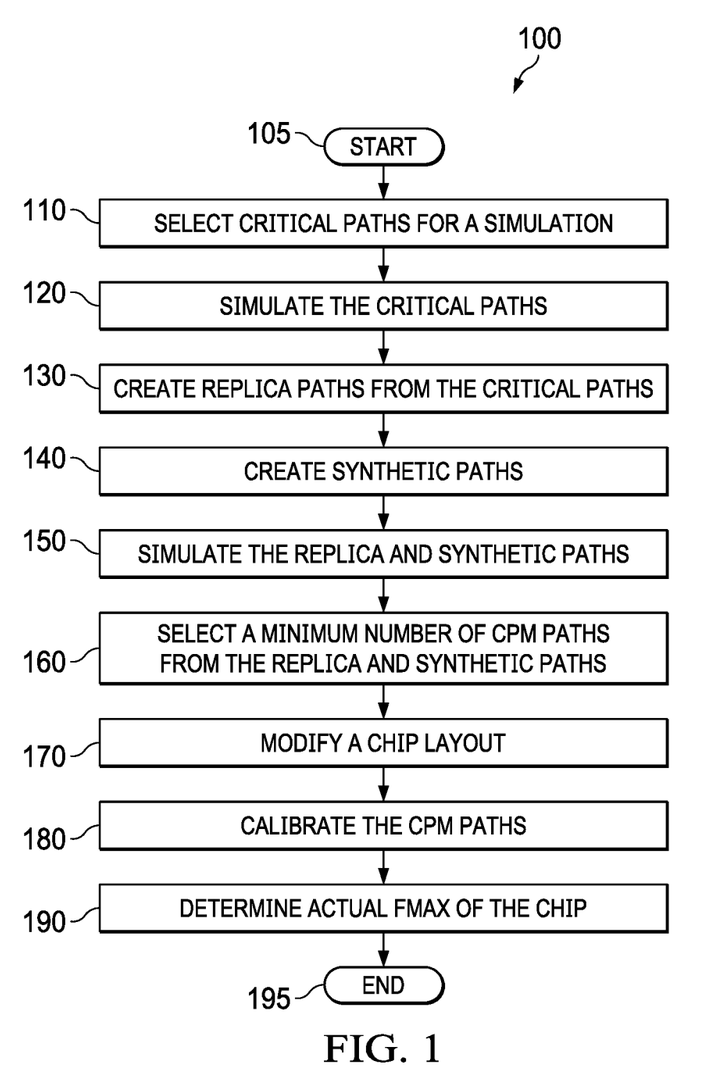
FIG. 1 illustrates a flow diagram of an embodiment of a method for determining a FMAX of a chip carried out according to the principles of the disclosure.

FIG. 1 illustrates an embodiment of a method 100 for determining a FMAX of a chip. The method 100 may be performed using a computer system, such as computer system 300, which is discussed below with respect to FIG. 3. The method 100 may be divided mainly into two parts, a pre-silicon design process, which includes steps 110-170 and a post-silicon characterization process, which includes steps 180-190. The method 100 starts at step 105.

During the pre-silicon design process, the goal is to have Frequency vs PVT behavior of CPM to be exactly the same as Frequency vs PVT behavior of the chip. With that in mind, the pre-silicon design process is carried out in following steps:

In steps 110 and 120, FMAX data of critical path in a chip design are obtained. More specifically, at step 110, critical paths for chip design FMAX simulation are selected. 'K' critical paths (or almost critical paths) are selected from across static timing analysis (STA) timing sessions spanning low-mid-high voltages, and low-high temperatures. 'K' can range from few hundreds to few thousands of paths based on simulation time available with the general rule being the larger the 'K' the better.

In the illustrated embodiment, critical paths are selected from a timing slack range of roughly (0, +20 ps). The reason for selecting paths with a positive slack is that while they may not be critical at that particular timing session, they can be critical at a PVT condition which is not used during timing sign-off but is still a possible operating condition for the chip. Out of the tens of thousands of paths within this slack window, similar kinds of paths are ignored and a set of few hundreds to few thousands of paths having a rich and diverse composition of logic gates (SVT, HVT, long channel, stacked transistor gates etc.), and wire delays are selected.

At step 120, the selected critical paths are simulated. As the selected paths provide a good representation of the most likely paths that can limit chip design FMAX at various PVT conditions, Monte Carlo simulations are performed on the selected paths at various voltages and temperatures. For example, 100 Monte Carlo samples (LHS SAMPLING) may be run on K selected critical paths at different PVT conditions. Monte Carlo samples will mimic the manufacturing process variations, while voltage and temperature are explicitly varied in the simulation. Frequency of the first failing path at each of these PVT conditions defines the chip design FMAX. The simulation provides FMAX data of the critical paths in a chip design.

Figure 2A:
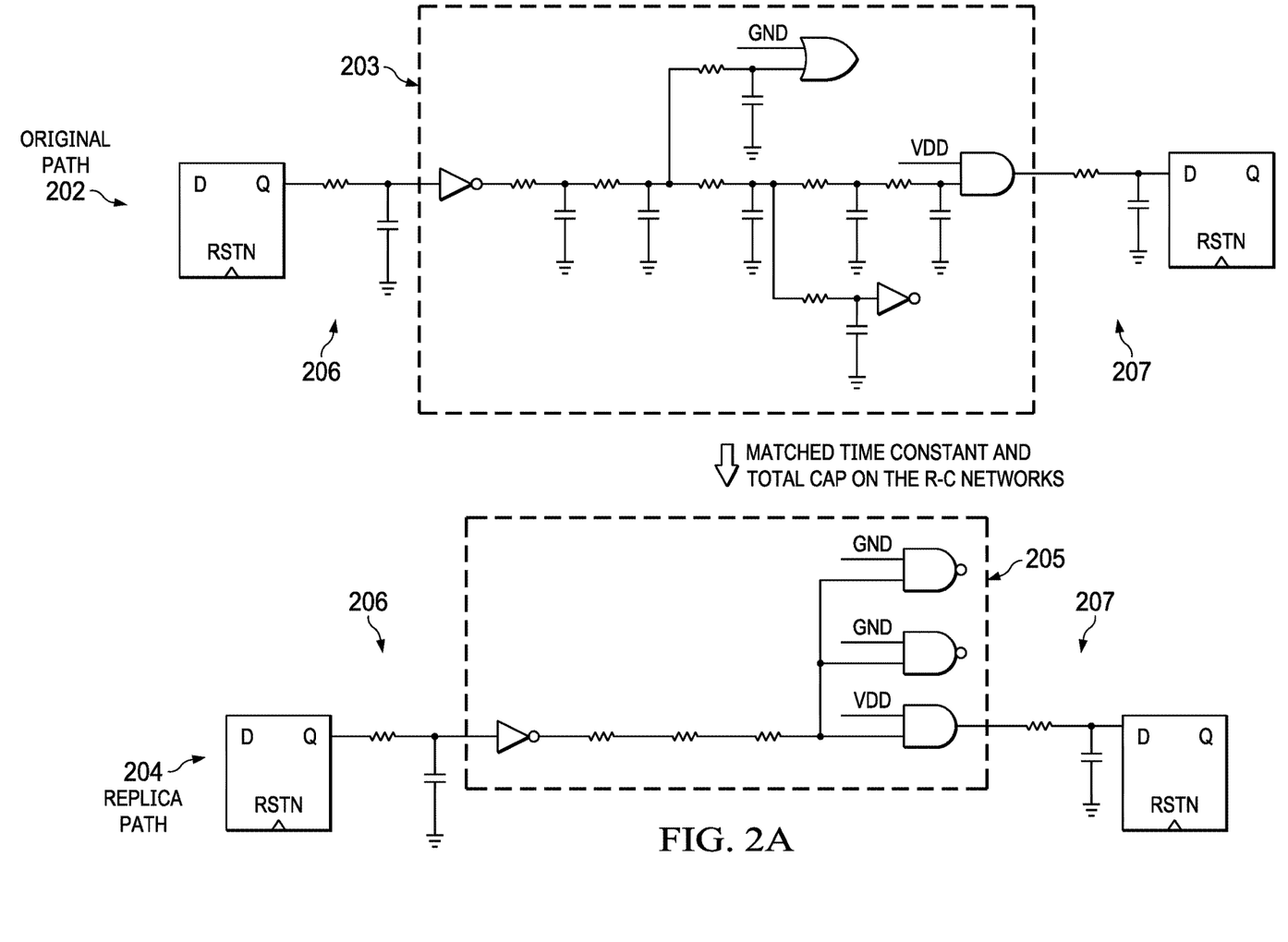
FIG. 2A illustrates embodiments of an original critical path and a replica path replicated from the original critical path.

In steps 130-150, FMAX data of replica and synthetic paths are obtained. First, replica paths are created at step 130. For each of the critical paths selected in step 110, a replica path is created such that the logic and wire delay of each datapath stage is matched. Hence the replica paths contain the same exact logic gates and same wire delay as the critical paths. This is achieved by designing a RC network per datapath stage which has the same time constant and same capacitance as that of the critical path. The distributed nature of the RC network can be different between the two, but they both achieve the same logic/wire delay ratio as illustrated in FIG. 2A. In FIG. 2A, an original critical path 202 and a replica path 204 replicated from the original path 202 are illustrated. The original and replica paths 202, 204 shares same input and output logic gates 206, 207 and wire delays, while having different RC networks 203, 205. Although RC networks 203, 205 of the original and replica paths 202, 204 have a different distributed structure, they have matching time constant and total capacitance. The RC networks 203, 205 may be computed using Elmore delay model that finds the first moment of a higher order equation, or extracted using timing analysis tools.

Each of the critical paths selected for the FMAX simulation will have a certain behavior across PVT variations. In particular, these paths could be prone to high local (or intra die) variation, and paths replicated from such paths may also exhibit high intra die variation. Since intra die variation by definition is uncorrelated to other paths, this would need to be margined for and addressed during the pre-silicon design process.

Two ways to minimize design sensitivity to local variation are provided as examples. The first way is, wherever possible, improving the slew at the input pins of logic gates along the datapath. Bad input slew on logic gates makes them more prone to higher delay variation due to random mismatch on the die. While there is no way around bad slew for wire delay dominated paths, logic delay dominated paths can be fixed to improve the slew and still retain the global process tracking, e.g., chip variation from chip to chip, wafer to wafer, or lot to lot For example, in FIG. 2B, replica version 210 is a perfect replica of a certain critical path. The replica version 210 is illustrated as a path between input and output gates 211, 215 including a series of delay stages 215. But this replica version 210 has a bad slew on inputs of the second and third delay stages 212, 213 (due to high fanout) causing their delay to be highly varying across multiple instances of the same path across the chip. As such, instead of the replica version 210, replica version 220, which has a far better slew and hence is much faster than the replica version 210, would be used to minimize the design sensitivity to local variation. The replica version 220 is a path between the same input and output gates 211, 215 having a series of simplified delay stages 224 followed by additional delay stages 225. The additional delay stages 225 provided in the end of replica version 220 to compensate for being a faster path. The additional delay stages 225 have the right SVT/HVT logic gate mix so as to not distort the PVT behavior of the original path.

Figure 2B:
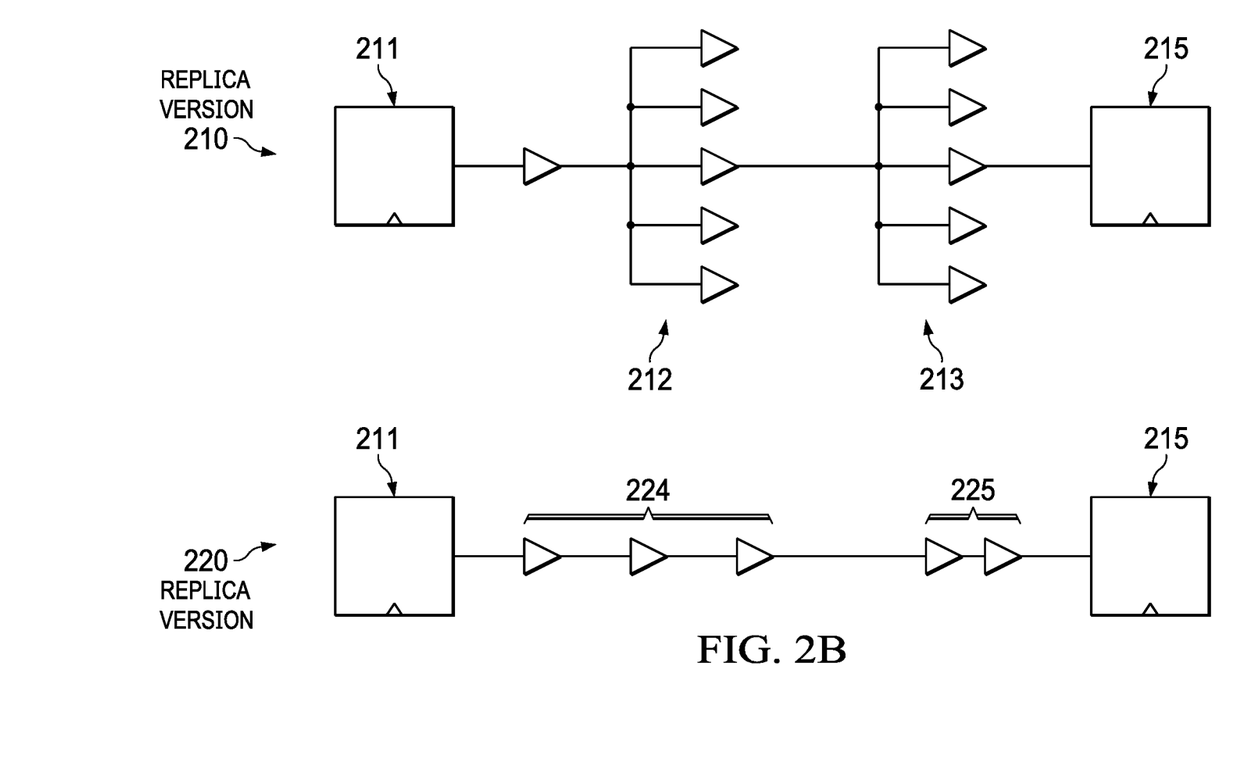
FIG. 2B illustrates embodiments of replica versions of a certain critical path.

A second way to minimize design sensitivity to local variation is to consider the median failure rate instead of the first failure of a potential CPM path since there are multiple instances of the same path on the chip. This prevents the replica path from being an outlier path.

Additionally, a chip's FMAX will be governed by an outlier path showing ~3 sigma local variation. Since there are thousands of critical paths at any PVT, it is highly likely that some path always experiences the worst-case local variation. However, CPM paths will not have thousands of instances on a chip, and so it is unlikely that some CPM path always experiences the worst case 3 sigma local variation. With fewer instances, it is more accurate to estimate the mean/median. Hence, the mean delay of potential CPM paths is aligned, at design time, with the three-sigma (local variation) value or a timing wall of FMAX at all PVTs.

Figure 2C:
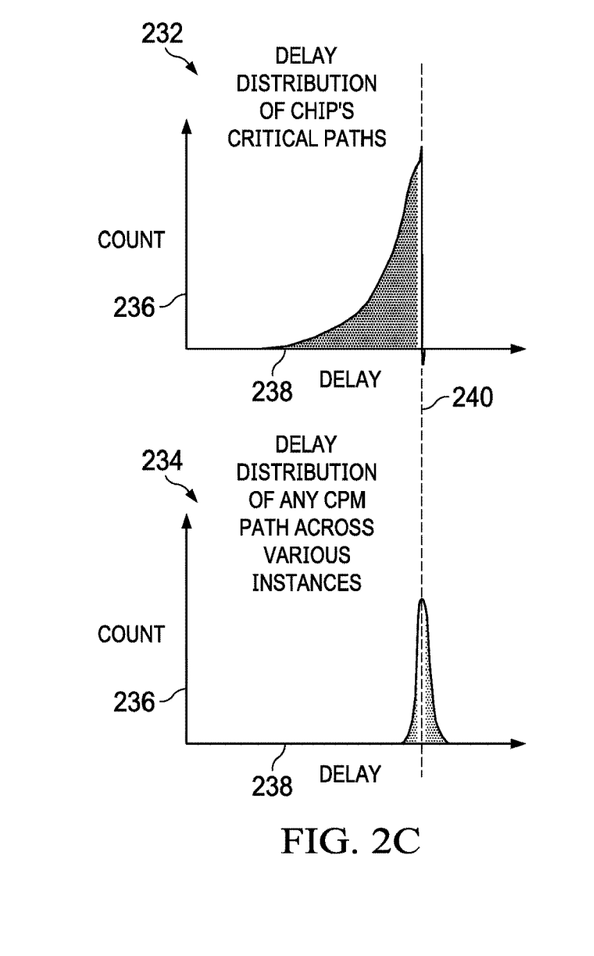
FIG. 2C illustrates exemplary delay distributions of replica paths.

FIG. 2C illustrate two delay distributions 232, 234 of critical and replica paths. The first distribution 232 illustrates a delay distribution of the critical paths on the chip including the worst case, 3 sigma local variation, and the second distribution 234 illustrates a delay distribution of the replica paths with aligned mean delays to the 3 sigma point of the chip critical paths. Delay counts are on the Y axis 236 and delay values are on the X axis 238. To shift the mean delay of the replica paths to the 3-sigma value 240, additional delay stages are added. When adding more delay stages, it is important to not distort the PVT behavior of the original critical paths, from which the replica paths are replicated.

Figure 2D:
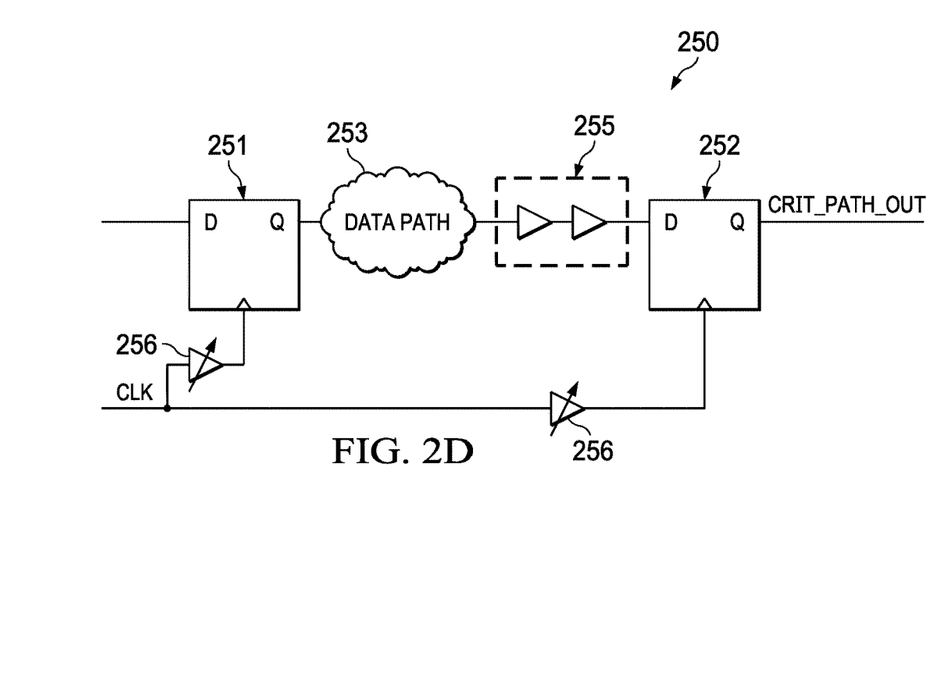
FIG. 2D illustrates an embodiment of a critical path monitor path that has been created from a replica path.

FIG. 2D illustrates a CPM path 250 that has been created by adding delay stages 255 to a replica path to align the replica path's mean delays and to also retain the PVT behavior of the original critical path. In the illustrated embodiment, the replica path includes input and output gates 251, 252 and data path 253, and is connected to tunable delay stages 256 that can be used to adjust its clock skew post-silicon. For a heavily wire dominated data path, the additional delay added would also be a wire delay dominated one, for an HVT logic dominated data path, the additional delay added would also be comprised of HVT cells and so on.

At step 140, in addition to the replica paths, synthetic critical paths that can be critical at different PVT conditions are created. More specifically, Monte Carlo simulations are first run on various standard cells present in the library (SVT, HVT, long channel devices, wire dominated etc.) to analyze their behavior across PVT conditions. Based on this, the standard cells are clustered into different groups, with cells in a cluster being mutually least correlated to cells in other clusters. Then a synthetic path is made by picking standard cells from different clusters to reach a target delay at a PVT condition, in which the synthetic path needs to be critical. This is a bottom-up way of synthesizing critical paths out of standard cells available in the library. By having different proportion of cells belonging to different clusters, the generated synthetic paths can have different behavior across PVT from the original and replica critical paths. In one embodiment, few tens of synthetic critical paths are designed with this approach.

At step 150, all the potential CPM paths, i.e. the synthetic paths and the replica (+slightly tweaked) paths are simulated. Each of the potential CPM paths is simulated under the same condition as the original critical paths, i.e. using the same Monte Carlo samples, voltages and temperatures, and the simulation data is used to construct a CPM FMAX data set with all the paths. CPM FMAX (FCPM) at any given PVT (i.e. any of the PVT data points) will be the defined by the slowest path in the whole set of paths. Different CPM instances on the chip will have some local variation, hence there would be multiple FCPM values—FCPM<0>, FCPM<1>, . . . FCPM<n>. FCPM_AVG=Average of all instances, i.e. average failing frequency of CPM on the chip, is aligned with the FMAX of the critical paths.

The entire pool of all the potential CPM paths cannot be placed within macros as it will take up a significant amount of area per macro. So, out of this pool of possible CPM paths, the smallest set of paths which can provide a comprehensive coverage are selected at step 160. The comprehensive coverage here refers to a coverage that minimizes the error between FCPM_AVG and FMAX of the critical paths over all the simulated PVT conditions.

In order to choose a small subset of paths from the potential paths, multiple strategies can be used. Using a greedy algorithm, the potential paths are evaluated for the selection one at a time. The algorithm first computes initial RMS error between the FMAX data of the potential CPM paths and the FMAX data of the critical paths across all PVT conditions. One by one, a path whose removal least hurts the RMSE is rejected. Paths are rejected one at a time until there is a sharp increase in the RMSE. The sharp increase may be defined as a $2^{nd}$ derivative of a "RMSE vs Number of Eliminated paths" curve being greater than a threshold. The threshold is a user provided input based on empirical data/past experience. The algorithm stops at that point, and a number of the remaining paths indicate the minimal number of unique CPM paths needed to track FMAX comprehensively. Alternatively, under another bottom-up approach, one could use orthogonal matching pursuit which finds the best sparse approximation out of the potential K paths. This algorithm works by adding 1 path at a time whose addition reduces RMSE the most.

Figure 2E:
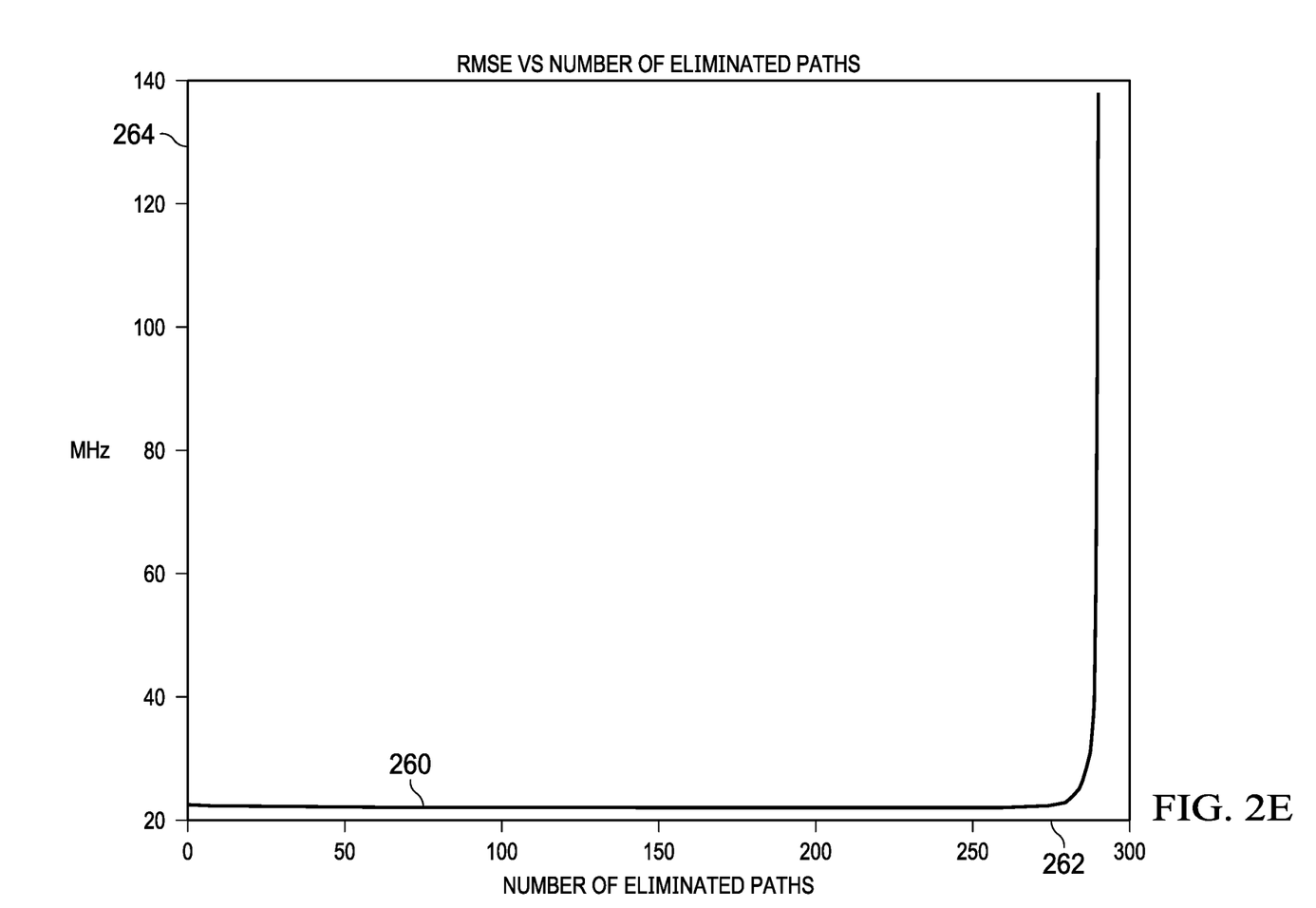
FIG. 2E illustrates an exemplary graph of how a root mean square error change over added potential critical path monitor paths.

FIG. 2E is an example of a "RMSE vs Number of Eliminated paths" curve that illustrates how RMSE 260 between FMAX data of potential CPM paths and FMAX data of critical paths across all PVT conditions changes over the evaluation of paths. Under the greedy approach, the number of eliminated paths is plotted on X axis 262, and the MHz of the RMSE is on Y axis 264. In the illustrated example, the RMSE 260 stays mostly flat until almost 89% of the K total paths are eliminated. There is some baseline error at the beginning which can be attributed to difference between the RC networks in the replica versus the critical paths. The wire segments in the replica paths may not use the same metal layer always and their lengths could be different. This results in some baseline error between the FMAX data of the critical paths and the FMAX data of the potential CPM paths.

This greedy approach allows selecting the smallest set of paths for PVT coverage across the whole operating space with a low RMSE. Also, as the time complexity of this path selection approach is polynomial ($O(n^2)$, for selecting the smallest set of paths out of a total of n possible paths), the search algorithm execution is fast.

At step 170, a chip layout is modified to include multiple instances of the paths that have been selected at the step 160. More specifically, the multiples instances of the CPM that include the selected paths are uniformly and physically spread out across the whole die to average out any random variations present on the die. Also, having uniformly spread out instances allows the CPMs to sense local hotspots due to high local activity in some part of the chip. The step 170 concludes the pre-silicon design process of the method 100.

Once the chip has been manufactured according to the chip design, the post-silicon characterization process begins at step 180. The selected paths in the CPM are calibrated based on various workloads at the step 180. The calibration step 180 takes into account dynamic supply noise related effects such as IR drop and clock stretching, which would not be present if the CPM was calibrated without any workload being run on the chip. The CPM has tunable delay knobs, e.g., tunable clock skew, that can be used to adjust the delays in each path to the chip design FMAX. These tunable delay knobs can also be programmed to re-tune the CPM to a different failing point based on workloads. For example if some workload is known to not exercise the worst case critical paths, the CPM path's clock skew can be tuned to make it fail at a faster clock frequency.

Each path in CPM can be tuned independently. For a given path, the tune setting can be global, i.e. same for all chips, or it can be made as a function of some fuse blown on the chip. If having a single global tuning for a path results in CPM FMAX deviating from chip design FMAX, then the single global tuning is pulled back closer to chip design FMAX. In such cases, the tune setting is made as a function of some static process marker such as a ring oscillator frequency, where the ring oscillator measures the relevant parameter necessary to set the right tuning for a path. Once this characterization exercise is over, these tune settings (either global for all chips, for a function of a fused value) are final. In various examples, only a one-time silicon characterization effort is needed to tune the CPM to the actual FMAX for a fixed set of chips.

As mentioned above, each of the critical paths within the CPM can be configured into a ring-oscillator and its frequency can be measured. This provides an option to fuse a CPM path's ring oscillator mode frequency and use it as a potentially better Process indicator than SPEEDO in the curve fit based FMAX model, i.e. FMAX_model=g(PCPM, V,T). Hence if some product SKUs cannot support DVFS-CPM loop, it can still be used as a better static process marker fused on the chip.

At step 190, the actual FMAX of the chip is determined. Based on feedbacks from the CPM, a clock frequency of the chip is set and adjusted until it reaches the actual FMAX of the chip. The initial frequency is set through speed binning of a group of sampled chips. Their maximum frequency was swept from 0 to failing frequency, and a safe frequency is chosen so lesser than 0.13% of the chip population can fail at the frequency.

Figure 2F:
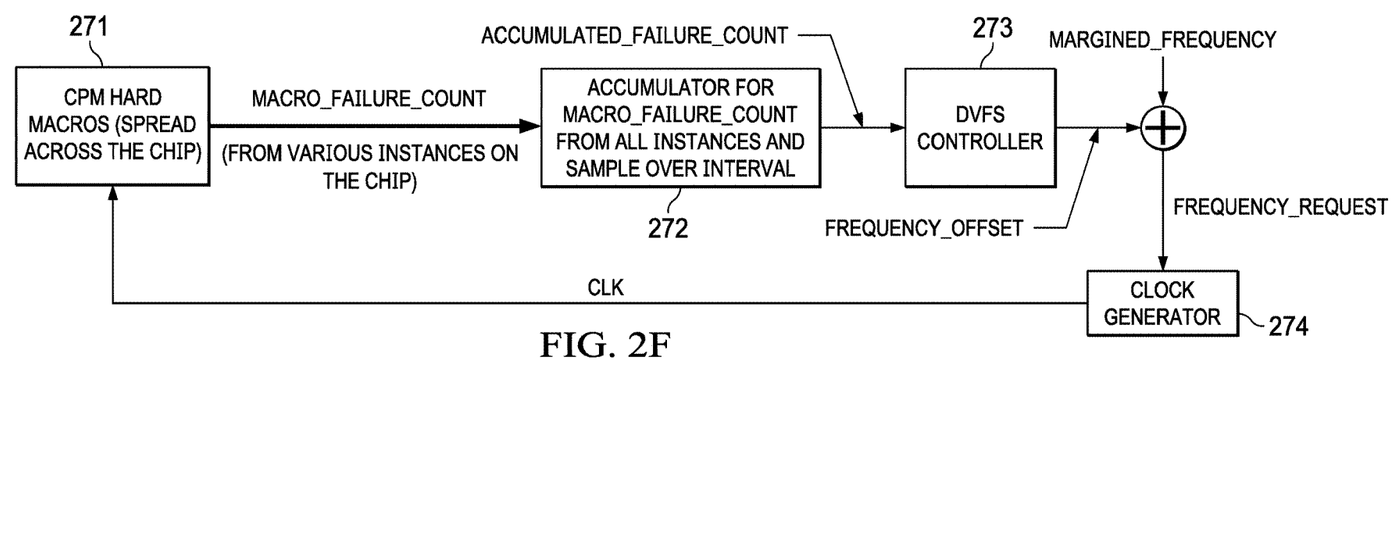
FIG. 2F illustrates an embodiment of a controller loop and a corresponding frequency offset change plot.

The clock frequency is adjusted using a simple hardware controller implemented by the DVFS system, such as a controller loop 270 of FIG. 2F. In FIG. 2F, the controller loop 270 includes: multiple instances, e.g., hard macros, of the CPM 271 that observes paths failing in the presence of various workloads; an accumulator 272 that accumulates a number of failing paths over a sampling interval; an on-chip DVFS controller 273 that provides a frequency offset based on the accumulated failure count over the sampling interval; and a clock generator 274 that generates the clock frequency (CLK) based on a frequency request that combines the frequency offset and predefined margin (margined_frequency).

Frequency Offset change plot 280 in FIG. 2F shows how the offset changes based on the accumulated failure count over the sampling interval from the accumulator 272. When the accumulated failure count 272 over the sampling interval is less than a first lower threshold (THRESH_LO) 277, the frequency of clock signal is continuously stepped up by the controller 273 via a positive frequency offset 275. When the accumulated failure count over the sampling interval is greater the first threshold 277 but still less than a second threshold 278, the frequency boosting stops. When the accumulated failure count is greater than the second higher threshold (THRESH_HI) 278, the frequency of the clock signal is stepped down (one frequency step at a time) via a negative frequency offset 276. The control loop 270 makes a decision at the end of each sampling interval whether to adjust, e.g., increase/decrease, or maintain the clock frequency.

The frequency, at which the accumulated failure count remains between the first and second thresholds 277, 278, is the actual FMAX of the chip, and when the frequency of the clock signal reaches the actual FMAX of the chip at step 195, the method 100 ends.

In one embodiment, in addition to the number of failing paths, the nature of workload is also considered at step 190. More specifically, when a particular workload is exercising a particular unit in a chip, a timing failure of a CPM path that is located in that particular unit is weighed more heavily than a timing failure of other CPM path that is not located that particular unit. For example, a single timing failure of a CPM path that is in the exercising unit may be counted more than once, and/or a single timing failure of the CPM path that is in a non-exercising unit may be counted less than once, or may even be ignored.

Figure 3:
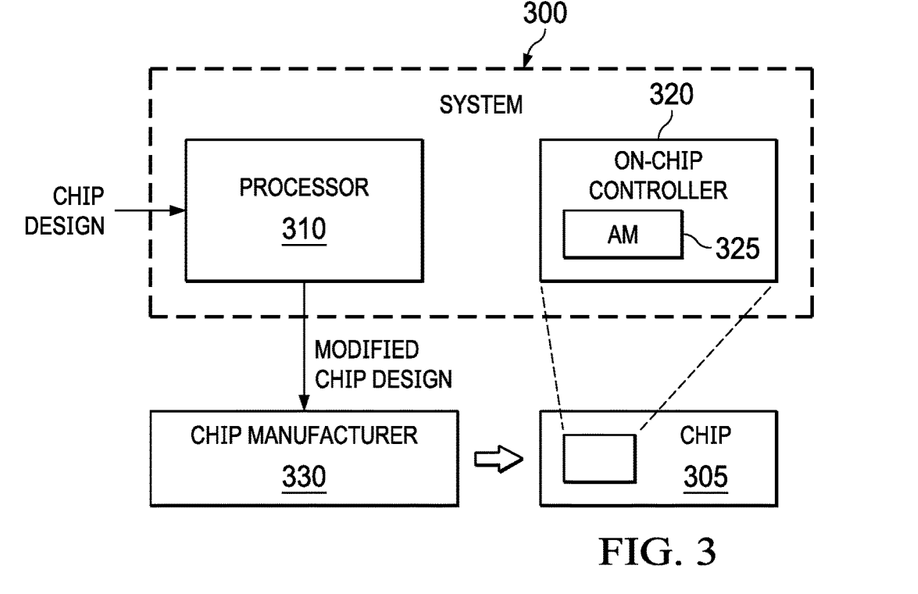
FIG. 3 illustrates an embodiment of a system for determining an actual FMAX of a chip implemented according to the principles of the disclosure.

FIG. 3 illustrates an embodiment of a system 300 for determining an actual maximum operating frequency (FMAX) of a chip 305. The system 300 may perform a method such as 100 in FIG. 1 to determine the actual FMAX of the chip. The system 300 includes a processor 310, and an on-chip controller 320 that are communicably connected to one another using conventional means.

The processor 310 is configured to perform the pre-silicon design process. The processor 310 is configured to obtain FMAX data of critical paths in a chip design (chip design FMAX data), obtain FMAX data of potential CPM paths (CPM FMAX data), select a minimum number of the potential CPM paths that give a comprehensive PVT coverage across an entire operating space of the chip based on RMSE between the chip design FMAX data and the CPM FMAX data, and modify the chip design to uniformly and physically spread out multiple instances of CPM, which includes the minimum number of the selected potential CPM paths, across a die of the chip.

In the illustrated embodiment, the processor 310 obtains the chip design FMAX data by selecting critical paths in the chip design based on slack ranges and logic gate and wire delay compositions of the critical paths, and simulating the critical paths at various voltages and temperatures. To account for a broad range of operating conditions, the critical paths having a positive slack and a rich and diverse composition of logic gates and wire delays are selected and simulated using a Monte Carlo simulation method over numerous, e.g., hundreds, PVT conditions.

In the illustrated embodiment, the processor 310 obtains the CPM FMAX data by generating the replica paths that match the logic gate and wire delay compositions, time constants and capacitances of the critical paths, and simulating the replica path at the same various voltages and temperatures as the critical paths. To minimize an intra die variation of the replica paths, the processor 310 may be further configured to adjust slews of logic gates in the replica paths, use median failure rates of the replica paths, and/or align mean delays of the replica paths to three-sigma points of the critical paths.

In addition to the replica paths, the processor 310 creates and simulates synthetic critical paths as the potential CPM paths. The synthetic paths are created such that they behave differently from the critical paths at the various voltages and temperatures. As described above with the step 140 in FIG. 1, to create a synthetic path, the processor 310 may be configured to group standard cells into clusters that are mutually least correlated to one another, and uses the standard cells from different clusters to reach a target delay at a PVT condition, at which the synthetic path is critical.

In the illustrated embodiment, the processor 310 selects a minimum number of the potential CPM paths, e.g., the replica paths and the synthetic paths, that give a comprehensive PVT coverage across an entire operating space of the chip. The paths are selected by eliminating some of the replica and synthetic paths, removals of which least hurt the RMSE. As described above with step 160 in FIG. 1, the replica and synthetic paths are evaluated one at a time until there is a sharp increase in the RMSE.

In the illustrated embodiment, the processor 310 physically and uniformly spread out the minimum number of selected paths across the chip by modifying the chip design to include multiple instances of CPM, which includes the selected potential CPM paths across the die of the chip. Having the selected potential CPM paths uniformly and physically spread out across the die of the chip averages out any random variations that may be present on the die. Also, the uniformly spread out CPM paths allows the instances of the CPM to sense local hotspots due to high local activity in some part of the chip.

Based on the modified chip design, a chip manufacturer 330 manufactures the actual chip. The manufactured chip 305 is then tweaked in a post-silicon characterization process using the controller 320. The controller 320 calibrates the printed CPM instances based on (in presence of) various workloads and determines the actual FMAX of the chip based on the performances of the CPM paths in presence of the various workloads.

Similar to the step 180 in FIG. 1, the controller 320 calibrates the CPM paths using delay tuners of the CPM instances. Using the delay tuners, the controller 320 takes into account dynamic supply noise related effects such as IR drop and clock stretching, which would not be present if the CPM paths were calibrated without any workload being run on the chip. Each path in the CPMs may also be tuned/calibrated independently.

Once calibrated, the controller 320 determines the actual FMAX of the actual chip based on feedbacks from the CPM instances. More specifically, the controller 320 counts the number of paths failing in various CPM instances in the presence of various workloads over a sampling period and adjusts the clock frequency based on a comparison between the counted number and a threshold. As such, although not shown, the controller 320 includes an accumulator that accumulates a number of failing paths over a sampling interval, e.g., accumulator 272 in FIG. 2F, an DVFS controller that provides a frequency offset based on the accumulated failure count over the sampling interval, e.g., DVFS controller 273 in FIG. 2F; and a clock generator 274 that generates a clock frequency signal based on a frequency request that combines the frequency offset and a predefined frequency margin.

Figure 4:
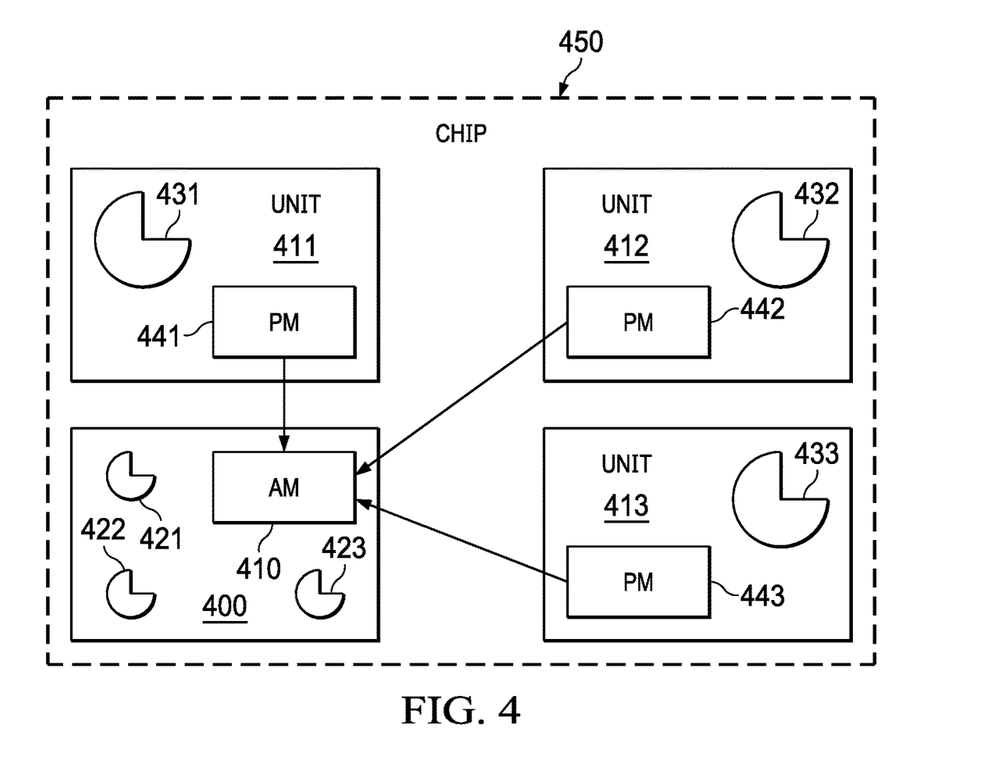
FIG. 4 illustrates an embodiment of a control unit for selectively weighing a number of failing paths in a chip.

In the illustrated embodiment, the on-chip controller 320 includes an activity monitor (AM) 325 that determines which unit(s) of the chip 305 is working on a workload. The controller 320 uses indications from the activity monitor 325 to selectively weigh the number of failing paths based on unit locations of the failing paths and the workloads when determining the actual FMAX of the chip 305. FIG. 4 illustrates an exemplary embodiment of the controller 320.

FIG. 4 illustrates an on-chip controller 400 located on a chip 450 that is being evaluated by the controller 400. The in illustrated embodiment, the controller 400 includes models 421-423 of actual CPM paths 431-433 that are printed in units 411-413 of the chip 450. The controller 400 also includes an activity monitor (AM) that is 410 communicatively coupled to performance monitors (PM) 441-443 of the units 411-414. The performance monitors 441-443 monitor the respective CPM paths 431-433 and indicate to the activity monitor 410 a presence of a workload in the respective units 411-413 and a number of failing paths in the respective CPM paths 431-434. For example, when the activity monitor 410 learns that the current workload is being worked on by the units 411 and 412, the controller 400 may weigh failures of the CPM paths 431, 432 in the units 411 and 412 more than failures of the CPM paths 433 in the unit 413, or even choose to ignore the failures in the unit 413 since the CPM path failures in the units 411, 412 are better indicators of the chip performance.

Those skilled in the art to which this application relates will appreciate that other and further additions, deletions, substitutions and modifications may be made to the described embodiments.

What is claimed is:

1. A method for determining an actual maximum operating frequency (FMAX) of a chip, comprising:
    obtaining a FMAX data of critical paths in a chip design;
    obtaining a FMAX data of potential critical path monitor (CPM) paths, which include replica paths of the critical paths; and
    selecting a minimum number of the potential CPM paths as selected CPM paths based on a root mean square error (RMSE) between the FMAX data of the critical paths and the FMAX data of the potential CPM paths.

2. The method of claim 1 further comprising:
    calibrating the selected CPM paths in presence of various workloads; and
    determining the actual FMAX of the chip based on performances of the selected CPM paths in the presence of the various workloads.

3. The method of claim 1 further comprising modifying the chip design to uniformly and physically spread out instances of a CPM that includes the selected CPM paths across the chip.

4. The method of claim 1, wherein the obtaining the FMAX data of the critical paths includes:
    selecting the critical paths from the chip design based on slack ranges and logic gate and wire delay compositions of the critical paths; and
    simulating the critical paths at various voltages and temperatures.

5. The method of claim 4, wherein the obtaining the FMAX data of the potential CPM paths includes:
    generating the replica paths that match the logic gate and wire delay compositions, time constants and capacitances of the critical paths;
    minimizing an intra die variation of the replica paths, and
    simulating the replica paths at the various voltages and temperatures.

6. The method of claim 5, wherein the minimizing includes at least one of:
    adjusting slews of logic gates in the replica paths; using median failure rates of the replica paths;
    and aligning mean delays of the replica paths to three-sigma points of the critical paths.

7. The method of claim 5, wherein the obtaining the FMAX data of the potential CPM paths includes creating synthetic paths that behave differently from the critical paths at the various voltages and temperatures using mutually least correlated standard cells, and simulating the synthetic paths at the various voltages and temperatures.

8. The method of claim 1, wherein the selected CPM paths are selected by adding, one at a time, the potential CPM paths that reduce the RMSE the most until the RMSE reaches a target RMSE or eliminating some of the potential CPM paths, removals of which least hurt the RMSE.

9. The method of claim 2, wherein the calibrating includes calibrating each of the selected CPM paths independently.

10. The method of claim 2, wherein the calibrating includes calibrating based on dynamic supply noise related effects that are associated with the various workloads.

11. The method of claim 2, wherein the determining includes: counting a number of timing failures in the selected CPM paths in the presence of the various workloads; comparing the number of timing failures to thresholds; adjusting a clock frequency of the chip based on the comparing; and repeating the counting, the comparing, the adjusting until the clock frequency reaches the actual FMAX of the chip.

12. The method of claim 11, wherein the counting includes weighting the timing failures in the selected CPM paths based on locations of the timing failures and the various workloads.

13. A system for determining an actual maximum operating frequency (FMAX) of a chip, comprising:
    a processor configured to:
        obtain a FMAX data of critical paths in a chip design;
        obtain a FMAX data of potential critical path monitor (CPM) paths, which include replica paths of the critical paths; and
        select a minimum number of the potential CPM paths as selected CPM paths based on a root mean square error (RMSE) between the FMAX data of the critical paths and the CPM FMAX data of the potential CPM paths.

14. The system of claim 13 further comprising:
    a controller configured to calibrate the selected CPM paths in presence of various workloads and determine the actual FMAX of the chip based on performances of the selected CPM paths in the presence of the various workloads.

15. The system of claim 13, wherein the processor is further configured to modify the chip design to uniformly and physically spread out instances of a CPM that includes the selected CPM paths across a die of the chip.

16. The system of claim 13, wherein the processor is configured to obtain the FMAX data of the critical paths by:
    selecting the critical paths from the chip design based on slack ranges and logic gate and wire delay compositions of the critical paths; and
    simulating the critical paths at various voltages and temperatures.

17. The system of claim 16, wherein the processor is configured to obtain the FMAX data of the potential CPM paths by:
    generating the replica paths that match the logic gate and wire delay compositions, time constants and capacitances of the critical paths;
    minimizing an intra die variation of the replica paths; and
    simulating the replica paths at the various voltages and temperatures.

18. The system of claim 17, wherein the minimizing includes at least one of: adjusting slews of logic gates in the replica paths; using median failure rates of the replica paths; and aligning mean delays of the replica paths to three-sigma points of the critical paths.

19. The system of claim 17, wherein the processor is configured to obtain the CPM FMAX data by: creating synthetic paths that behave differently from the critical paths at the various voltages and temperatures using mutually least correlated standard cells, and simulating the synthetic paths at the various voltages and temperatures.

20. The system of claim 13, wherein the processor is configured to select the selected CPM paths by adding, one at a time, the potential CPM paths that reduce the RMSE the most until the RMSE reaches a target RMSE or eliminating some of the potential CPM paths, removals of which least hurt the RMSE.

21. The system of claim 14, wherein the controller is configured to calibrate each of the selected CPM paths independently.

22. The system of claim 14, wherein the controller is configured to calibrate the selected CPM paths based on dynamic supply noise related effects that are associated with the various workloads.

23. The system of claim 14, wherein the controller is configured to determine the actual FMAX of the chip by:
- counting a number of timing failures in the selected CPM paths in the presence of the various workloads;
- comparing the number of timing failures to thresholds;
- adjusting a clock frequency of the chip based on the comparing; and
- repeating the counting, the comparing, and the adjusting until the clock frequency reaches the actual FMAX of the chip.

24. The system of claim 23, wherein the controller includes an activity monitor configured to detect particular units in the chip that are affected by the various workloads.

25. The system of claim 24, wherein the controller is configured to weight the timing failures in the selected CPM paths based on locations of the timing failures and the various workloads.

\* \* \* \* \*